(12) United States Patent
Tang et al.

(10) Patent No.: US 9,338,753 B2
(45) Date of Patent: May 10, 2016

(54) METHOD AND APPARATUS FOR PERFORMANCE MANAGEMENT IN WIRELESS BACKHAUL NETWORKS VIA POWER CONTROL

(71) Applicant: BLiNQ Wireless Inc., Ottawa (CA)

(72) Inventors: Taiwen Tang, Ottawa (CA); Hayssam Dahrouj, Toronto (CA); Jerry Pak Lup Chow, San Diego, CA (US); Radu Bogdan Selea, Vaughan (CA)

(73) Assignee: BLiNQ Wireless Inc., Ottawa (CA)

( * ) Notice: Subject to any disclaimer, the term of this patent is extended or adjusted under 35 U.S.C. 154(b) by 205 days.

(21) Appl. No.: 14/073,459

(22) Filed: Nov. 6, 2013

(65) Prior Publication Data

US 2014/0126500 A1    May 8, 2014

Related U.S. Application Data

(60) Provisional application No. 61/723,494, filed on Nov. 7, 2012.

(51) Int. Cl.
| | |
|---|---|
| *H04W 52/24* | (2009.01) |
| *H04W 52/36* | (2009.01) |
| *H04B 7/02* | (2006.01) |
| *H04W 52/34* | (2009.01) |

(52) U.S. Cl.
CPC .......... *H04W 52/241* (2013.01); *H04W 52/367* (2013.01); *H04B 7/022* (2013.01); *H04W 52/343* (2013.01)

(58) Field of Classification Search
None
See application file for complete search history.

(56) References Cited

U.S. PATENT DOCUMENTS

| | | | |
|---|---|---|---|
| 5,956,642 | A | 9/1999 | Larsson et al. |
| 7,729,257 | B2 | 6/2010 | Kodialam et al. |

(Continued)

FOREIGN PATENT DOCUMENTS

| | | |
|---|---|---|
| CA | 2809721 | 3/2012 |
| WO | 96/31009 | 10/1996 |

(Continued)

OTHER PUBLICATIONS

S. G. Kiani and D. Gesbert, entitled "Optimal and Distributed Scheduling for Multicell Capacity Maximization" IEEE Wireless Commun., vol. 7, No. 1, pp. 288-297, Jan. 2008.

(Continued)

*Primary Examiner* — Khoa Huynh
(74) *Attorney, Agent, or Firm* — Ridout & Maybee LLP (57) ABSTRACT

A method and system is disclosed for managing performance of a wireless backhaul network through power management, which provides a practical approach to balancing data throughput and fairness. For each transmit frame, one or more power zones is defined, each power zone comprising a set of radio resources operating at one transmit power level $P_i$, and the same power zone being defined over the same set of radio resources across all other clusters. The method maximizes the value of weighted weighted-sum utility, using a rate expression based on a CINR function. The optimization comprises a summation of the weighted logarithm of the rate expression plus a non-negative constant value, using a Newton's method approach, for fast and reliable convergence. Optimization may be based on long term averaged channel gains measured for each link. The value of c is selected to achieve a required balance of fairness and data throughput.

15 Claims, 9 Drawing Sheets

(56) References Cited

U.S. PATENT DOCUMENTS

| | | | |
|---|---|---|---|
| 7,826,417 | B2 | 11/2010 | Yang et al. |
| 2003/0103578 | A1* | 6/2003 | Yeh ............... H04L 25/03159 375/296 |
| 2004/0087327 | A1 | 5/2004 | Guo |
| 2009/0197603 | A1 | 8/2009 | Ji et al. |
| 2010/0009748 | A1 | 1/2010 | Timperley |
| 2010/0034151 | A1* | 2/2010 | Alexiou ............... H04B 7/022 370/329 |
| 2010/0087149 | A1 | 4/2010 | Srinivasan et al. |
| 2010/0097948 | A1* | 4/2010 | Barberis ............. H04B 17/005 370/252 |
| 2010/0159841 | A1 | 6/2010 | Barberis et al. |
| 2011/0222455 | A1 | 9/2011 | Hou et al. |
| 2012/0133557 | A1 | 5/2012 | Beaudin |
| 2012/0236731 | A1 | 9/2012 | Beaudin |
| 2012/0281648 | A1 | 11/2012 | Dahrouj et al. |

FOREIGN PATENT DOCUMENTS

| | | |
|---|---|---|
| WO | 2005/101882 | 10/2005 |
| WO | 2008/033369 | 3/2008 |
| WO | 2008/096383 | 8/2008 |
| WO | 2009/066986 | 5/2009 |
| WO | 2009/119463 | 10/2009 |
| WO | 2010/003509 | 1/2010 |
| WO | 2010/013245 | 2/2010 |
| WO | 2011/037319 | 3/2011 |
| WO | 2012/037643 | 6/2012 |
| WO | 2013/000068 | 1/2013 |

OTHER PUBLICATIONS

L. Venturino, N. Prasad, and X. Wang, entitled "Coordinated Scheduling and Power Allocation in Downlink Multicell OFDMA Networks," IEEE Trans. Veh. Technol., vol. 6, No. 58, pp. 2835-2848, Jul. 2009.

A. L. Stolyar and H. Viswanathan, entitled "Self-Organizing Dynamic Fractional Frequency Reuse for Best-Effort Traffic Through Distributed Intercell Coordination," in INFOCOM, Apr. 2009.

M. X. Gong, et al., "Load- and Interference-Aware Channel Assignment for Dual-Radio Mesh Backhauls", 2008 IEEE Global Telecommunications Conference (IEEE GLOBECOM 2008), pp. 1-6, Nov. 30-Dec. 4, 2008.

H. Dahrouj, W. Yu, T. Tang, J. Chow and R. Selea, "Coordinated scheduling for wireless backhaul networks with soft frequency reuse", in 21st European Signal Processing Conference (EUSIPCO), Marrakech, Morocco, Sep. 2013 (invited paper).

H. Dahrouj et al. "interference Mitigation Via Power Control Under the One-Power-Zone Constraint", IEEE Global Telecommun. Conf. (Globecom), Anaheim, CA, USA, Dec. 2012.

D. P. Bertsekas, in "The auction algorithm: A distributed relaxation method for the assignment problem," Annals of Operations Research, vol. 14, pp. 105-123, Dec. 1988.

* cited by examiner

| INPUT PARAMETER NOTATIONS | INPUT PARAMETER DESCRIPTION |
|---|---|
| $w_{ij}$ | THE WEIGHT OF THE LINK BETWEEN HUB $i$ AND RBM $j$ IN THE SPECIFIED POWER ZONE |
| $\alpha_{ij}$ | THE PHASE NOISE SCALING FACTOR OF THE LINK BETWEEN HUB $i$ AND RBM $j$ |
| $a$ | A MODEL PARAMETER OF THE CONTINUOUS RATE FUNCTION |
| $b$ | A MODEL PARAMETER OF THE CONTINUOUS RATE FUNCTION |
| $\Gamma$ | A MODEL PARAMETER OF THE CONTINUOUS RATE FUNCTION |
| $g_{ij}$ | THE CHANNEL GAIN OF THE LINK BETWEEN HUB $i$ AND RBM $j$ IN THE SPECIFIED SUB-BAND |
| $\sigma_{ij}^2$ | THE NOISE POWER OF THE LINK BETWEEN HUB $i$ AND RBM $j$ |
| $P_i^{(0)}$ | THE INITIAL POWER OF HUB $i$ FOR THE SPECIFIED POWER ZONE FOR POWER OPTIMIZATION |

FIG. 3

| MCS LEVEL | CINR THRESHOLD (dB) |
| --- | --- |
| QPSK 3/4 | 7 |
| 16 QAM 1/2 | 11 |
| 16 QUAM 3/4 | 14 |
| 64 QAM 2/3 | 19 |
| 64 QAM 3/4 | 21 |
| 64 QAM 5/6 | 23 |
| 256 QAM 6/8 | 26 |
| 256 QAM 7/8 | 30 |

METHOD AND APPARATUS FOR PERFORMANCE MANAGEMENT IN WIRELESS BACKHAUL NETWORKS VIA POWER CONTROL

CROSS-REFERENCE TO RELATED APPLICATIONS

This application claims priority from U.S. Provisional application No. 61/723,494, entitled "Method and apparatus for inter-cluster power management", filed Nov. 7, 2012, which is incorporated herein by reference in its entirety. This application is also related to U.S. patent application Ser. No. 13/463,478, filed May 3, 2012, entitled "Interference Mitigation with Scheduling and Dynamic Power Spectrum Allocation for Wireless Networks", which claims priority from U.S. provisional patent application No. 61/506,895, entitled "Interference Mitigation with Scheduling and Dynamic Power Spectrum Allocation for Wireless Networks", filed Jul. 12, 2011 and U.S. Provisional patent application No. 61/483,417, filed May 6, 2011, entitled "Interference Mitigation With Scheduling And MARA-Based Dynamic Power Spectrum Allocation For Wireless Backhaul Networks", the entire contents of which are incorporated herein by reference.

TECHNICAL FIELD

This invention relates to wireless backhaul networks for high capacity data networks, and to systems and methods for managing and mitigating interference through maximizing a weighted sum utility for improved network performance. It particularly relates to practical power control techniques to optimize a weighted sum utility for wireless backhaul products in MicroCell and PicoCell networks.

BACKGROUND

Interference mitigation is a key challenge in improving the capacity of future wireless networks. In a densely deployed and interference-limited network, an effective way to mitigate interference is through power control. The successful implementation of power control is, however, also dependent on its algorithmic complexity, the hardware limitations of the wireless front-end, and the ability to integrate power control with system-level operations, such as scheduling.

The use of power control for interference mitigation is of particular interest for wireless backhaul networks, which are deployed as a means to increase the network throughput for areas with high data traffic demand.

Power optimization in wireless networks can significantly improve the network wide performance, namely, throughput and fairness, in an interference-limited radio environment. Power optimization is usually through a maximization of the network wide sum utility. A -known utility function choice that improves both throughput and fairness is the sum of the logarithm of the long-term average data rate. However, optimization based on the exact form of this utility function requires continual updates of a measured average data rate of each network link and therefore, continual re-evaluation of the optimum power settings of each link, since this rate is dependent on the data traffic.

The classical problem of maximizing the log of long-term average rates often requires frequent updates of the found solutions, so as to adapt the problem to the changes in channel and traffic conditions. Further, classical solutions often involve additional iterations between scheduling and power control, which increases the problem computational complexity.

An iterative approach to joint power control and scheduling is disclosed, for example, in the above referenced, related co-pending U.S. patent application Ser. No. 13/463,478, entitled "Interference Mitigation with Scheduling and Dynamic Power Spectrum Allocation for Wireless Networks" by Dahrouj et al., and in PCT patent publication No. WO/2011/037319, published Mar. 31, 2011, by T. Kwon et al., entitled "Method and Device for User Scheduling and Managing Transmit Power in a Communication System" Other references that discuss scheduling and power control include: S. G. Kiani and D. Gesbert, entitled "Optimal and Distributed Scheduling for Multicell Capacity Maximization" IEEE Trans. Wireless Commun., Vol. 7, No. 1, pp. 288-297, January 2008"; L. Venturino, N. Prasad, and X. Wang, entitled "Coordinated Scheduling and Power Allocation In Downlink Multicell OFDMA Networks," *IEEE Trans. Veh. Technol.*, Vol. 6, No. 58, pp. 2835-2848, July 2009; and A. L. Stolyar and H. Viswanathan, entitled "Self-Organizing Dynamic Fractional Frequency Reuse For Best-Effort Traffic Through Distributed Intercell Coordination," in *INFOCOM*, April 2009.

The above solutions involve a complex process of iterations, where delays and changes in channel conditions impose additional practical challenges.

Thus, there is a need for alternative systems and methods for power control, and in particular, practically feasible methods for interference management and load balancing, which provide low computational complexity and fast convergence.

SUMMARY OF INVENTION

Thus, the present invention seeks to eliminate, or at least mitigate, disadvantages of these known systems and methods for performance management in a wireless backhaul network through power management, or at least provide an alternative.

Accordingly, aspects of the invention provide a method, a system and software for performance management in wireless backhaul networks, comprising optimization of a weighted sum utility function across the network using a rate expression based on a carrier to interference and noise ratio (CINR) function comprising a non-negative constant c which is selected to achieve a chosen balance of data throughput and fairness.

One aspect of the invention provides a method for performance management through power control in a wireless backhaul network comprising a plurality of fixed nodes, each node comprising a transmitter, receiver and directional antenna, said nodes being arranged as plurality of hubs and a plurality of Remote Backhaul Modules (RBM), wherein each hub i serves a respective cluster i of a set of RBMs j through hub-RBM wireless radio links ij, comprising both downlink and uplink channels, the method comprising:

for each transmit frame, defining one or more power zones, each power zone comprising a set of radio resources operating at one transmit power level $P_i$ for cluster i, and such that the same power zone is defined over the same set of radio resources across all other clusters k, wherein the transmit power level $P_i$ is between a minimum power level $P_{min}$ and a maximum power level $P_{max}$, and power zone boundaries are synchronized in time across all clusters of the backhaul network;

for each power zone, determining the transmit power level P, to be applied simultaneously in all clusters using the same set of radio resources, by steps comprising optimization of a weighted sum utility function across the network using a rate expression based on a carrier to interference and noise ratio (CINR) function;

wherein the weighted sum utility function across the network comprises a summation of the weighted logarithm of the rate expression plus a non-negative constant value c, and wherein, based on a Newton's method approach, the optimization is defined by:

$$\max_{P_i} \sum_i \sum_{j \in S_i} w_{ij} \log(\log(1 + CINR_{ij}) + c)$$

$$\text{s.t.} \quad CINR_{ij} = \frac{g_{ij} P_i}{\Gamma(\sum_{k \neq i} g_{kj} P_k + \alpha g_{ij} P_i + \sigma_{ij}^2)}$$

$$P_{min} \leq P_i \leq P_{max}$$

where:
$S_i$ is the set of RBMs belonging to the network cluster of Hub i in a particular power zone;
$w_{ij}$ represents the weight selected for hub i and RBM j; and $g_{ij}$ is a channel gain for radio link ij and
selecting the value of c to provide a chosen balance of proportional fairness and data throughput.

Thus, the method is based on maximizing a modified proportional fairness utility function, where a non-negative constant c is introduced into the utility expression. The constant value c introduced in the utility function expression serves to trade-off the sum data rate and the fairness performance. For example, the constant c is set to a default value of one. Alternatively, the value of c is swept between 0 and very large number to find an optimized tradeoff between the sum rate and fairness.

This power optimization technique enables Inter-Cluster Power Management (ICPM). It provides a method of determining transmit power settings to be applied to one or more sets of radio resources that are commonly defined across the wireless backhaul network. Transmissions over each defined set of radio resources, or power zone, may cause interference to other links using the same resources over the same carrier frequency in the wireless backhaul network. The optimization goal is to maximize a weighted sum rate defined as the summation of the weighted logarithm of the rate expression, plus a non-negative constant value, where the rate is approximated as a function of the CINR over the one or more sets of radio resources across the wireless backhaul network.

Similar to the classical log utility maximization, ICPM considerably improves the fairness performance when compared to the solution that maximizes the sum rate across the network. Compared to maximizing the minimum rate problem, ICPM suffers a fairness loss. However, this method improves the overall network throughput significantly.

A reasonable approximation to the long-term average rate is made using a form of the logarithm of long-term averaged carrier to interference and noise ratio (CINR) function. This approximation is good when the small scale fading variation of the channel is not too severe. This condition applies, for example, to wireless backhaul networks, since each node, i.e. hubs and remote backhaul modules (RBMs), are fixed in location and mounted at heights well above ground. In each cluster, if a power zone is shared by two or more RBMs, a resource boundary within the power zone is assigned dynamically based on traffic conditions of the RBMs.

The channel gain $g_{ij}$ may be the long-term average channel gain measured between the $j^{th}$ RBM and the hub in cluster i. When applied to the downlink, $g_{kj}$ is the long-term average channel gain measured between the $j^{th}$ RBM in cluster i and a potentially interfering hub in cluster k.

It will be appreciated, that w applied to the uplink instead of the downlink, the optimization is modified or transformed accordingly. For example, each link ij between a transmitting RBM j and a receiving hub i, $g_{ij}$ is the long term average channel gain measured for that radio link.

The method may comprises updating the weights $w_{ij}$ and the power levels $P_i$ with changes in channel measurements and data traffic load, so as to dynamically adapt to the interference environment.

In a preferred embodiment, the power level $P_i$ of each hub is found by changing variable $$v_i = \frac{1}{P_i},$$

determining $v_i$, and then updating $v_i$, and wherein the value of $v_i$ is found iteratively using the step size $d_i$ that can be found as $$d_i = \frac{grad_i}{scale_i},$$

wherein $$grad_i = -\sum_{j \in S_i} \frac{w_{ij}}{\log(1 + CINR_{ij}) + c} \frac{CINR_{ij}}{1 + CINR_{ij}} \frac{1 - \Gamma \alpha CINR_{ij}}{v_i} +$$

$$\sum_{k \neq i} \sum_{l \in S_k} \frac{w_{kl}}{\log(1 + CINR_{kl}) + c} \frac{CINR_{kl}^2}{1 + CINR_{kl}}$$

$$\frac{\Gamma_{gil} v_k}{g_{kl} v_i^2}$$

and wherein $$scale_i = \sum_{j \in S_i} \frac{w_{ij}}{\log(1 + CINR_{ij}) + c} \frac{CINR_{ij}}{1 + CINR_{ij}} \frac{(1 - \Gamma \alpha CINR_{ij})^2}{v_i^2} +$$

$$\sum_{j \in S_i} \frac{w_{ij}}{\log(1 + CINR_{ij}) + c} \frac{CINR_{ij}}{(1 + CINR_{ij})^2} \frac{(1 - \Gamma \alpha CINR_{ij})^2}{v_i^2} -$$

$$\sum_{j \in S_i} \frac{w_{ij}}{(\log(1 + CINR_{ij}) + c)^2} \left(\frac{CINR_{ij}}{1 + CINR_{ij}}\right)^2 \frac{(1 - \Gamma \alpha CINR_{ij})^2}{v_i^2}.$$

Successful convergence to an optimal point may be aided by a back-track line search of the form:
If n<number of iterations &$\Sigma_i |v_i^{(n)} - v_i^{(n-1)}|$>vtol&|$cost^{(n)} - cost^{(n-1)}$|>ctol Initialize $\delta_n = 1$;
Choose $\delta_n = \delta_n/4$ and $v_i^{(n)} = v_i^{(n-1)} + \delta_n d_i$ until $cost^{(n)} \geq cost^{(n-1)}$ and values $v_i^{(n)}$ are in the constraint set. The tolerance values, vtol and ctol, may be set to terminate the iterative process. A search history can be maintained and if processing is terminated without successful convergence to an optimal point, the highest point in the history is applied as the outcome of the optimization process.

Optionally, the maximization step further involves a summation over all power-zones with a maximum power-zone difference constraint across power zones, i.e. a temporal power constraint. In this case, the method comprises solving the unconstrained problem on a per-zone basis as described herein. Then, the method further comprises accounting for the maximum power-zone difference constraint, by steps comprising: checking if the difference between the maximum power of the zones of each hub i and the minimum power of the zones of that hub i exceeds some nominal value alpha, and then by increasing the minimum power-zone value so that the required difference is well satisfied, and repeating this process until all power-zones are within this difference for all hubs across the whole network.

The proposed methods are low in computational complexity and fast in convergence. They provide a good performance improvement as compared to conventional methods.

The method provides a reasonable approximation of the log of long-term average rates, which accounts for the long-term average CINR. This method is viable in wireless backhaul networks, and the approximation enables the design of low-complexity methods that offer a good performance improvement as compared to conventional systems, and which are amenable to practical implementation.

When the ICPM technique is applied for orthogonal frequency division multiple access (OFDMA) networks, the concept of ICPM can be applied to each sub-band, which is a subset of the OFDMA subcarriers, or the entire bandwidth depending on the use cases. The long term average CINR can be obtained by computing the average signal power and the average noise and interference power on each sub-band or the entire bandwidth. In one embodiment, the method is based on an interference term that is proportional to the signal power in CINR, which represents the interference caused by frequency offset, phase noise and other RF non-idealities.

Accordingly, other aspects of the invention provide: apparatus in a backhaul network comprising processor means for implementing steps of the method; a computer program product embodied in a transmission medium or storage medium for performing, in processor means of a backhaul network, steps of the method; and a system in a wireless backhaul network comprising processor means for implementing the steps of the method.

The foregoing, and other objects, features, aspects and advantages of the present invention will become more apparent from the following detailed description, taken in conjunction with the accompanying drawings of preferred embodiments of the invention, which description is by way of example only.

DETAILED DESCRIPTION OF THE EMBODIMENTS

A method for performance management of a wireless backhaul network 100 using power management according to an embodiment of the present invention will be described with reference to FIG. 1A, which represents schematically the topology of a system comprising a point-to-multipoint wireless backhaul wireless network, comprising a plurality of fixed nodes. That is, the nodes comprise a plurality of hubs 102 and RBMs 104 arranged as clusters 120. In each cluster 120, a hub 102 serves a set of remote backhaul modules (RBMs) 104 through wireless links (radio links) 110. In this example the hubs 102 and RBMs 104 are arranged as 21 clusters, with each hub serving up to four Remote Backhaul Modules (RBMs). The network comprises a plurality of cells, each with three hubs 102 with sectorial antenna that are co-located at the cell center, with one cluster, i.e. 120-1, 120-2, 120-3 mapped to each of the three sectors of the cell. The frequency reuse factor of the system is 1.

Figure 1A:
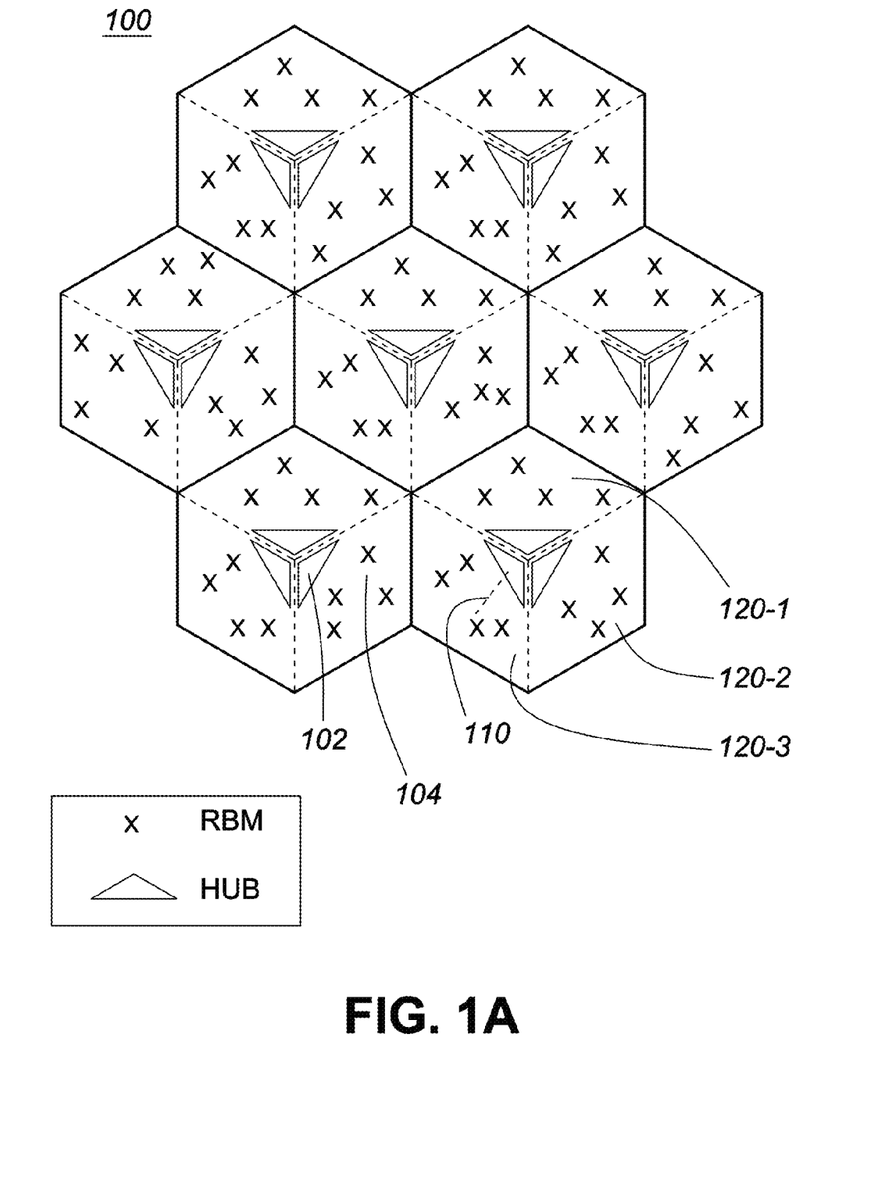
FIG. 1A represents schematically the topology of a point-to-multipoint wireless backhaul network, for implementation of a method for performance management using inter-cluster power management according to an embodiment of the invention; the network comprises a plurality of fixed nodes, i.e. a plurality of hubs and remote backhaul modules (RBMs), arranged as a plurality of clusters, each cluster comprising a hub serving a set of RBMs.
Figure 1B:
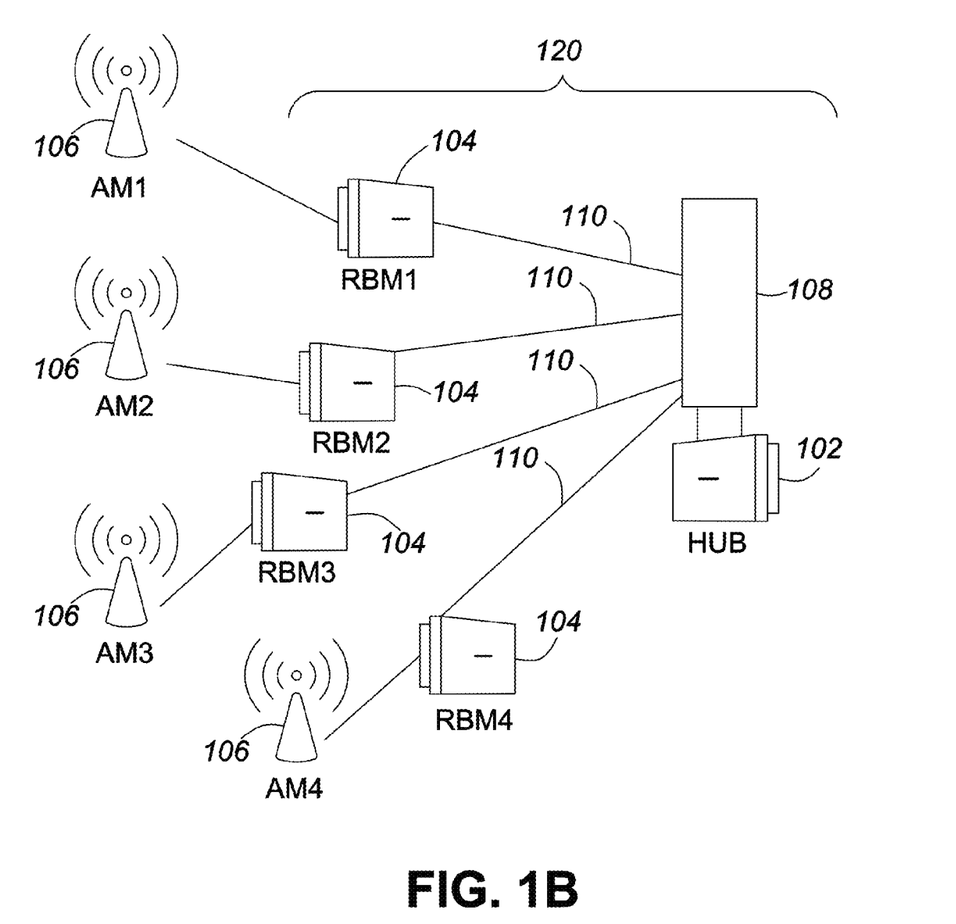
FIG. 1B shows schematically wireless links of one cluster of the backhaul network shown in FIG. 1A.

As illustrated in FIG. 1B, which represents one cluster 120 of the wireless backhaul network, each RBM 104 communicates with and is co-located with an access module (AM) 108 of an access network, such as a small cell-base station, using a wired connection, e.g. an Ethernet cable. The hub module 102 has a separate directional antenna 108 and RBMs 104 each have an integrated directional antenna that is directed towards the hub. Unlike a multi-hop architecture, each link 110 comprises only one hop from each RBM 104 to a respective hub to carry the traffic. It is also different from the relay system where the access links and relay links share the same radio frequency band. The backhaul network operates at a different frequency band from that of the access network.

To enable ICPM, the concept of a power zone is introduced. Each transmit frame comprises a plurality of time zones called power zones, wherein each power zone operates at one power level (power setting). Across the network, power zone boundaries are synchronized in time to allow for effective interference management. That is, a power zone is a set of radio resources for which a common transmit power setting is applied within a network cluster. The same power zone is defined over the same set of radio resources across all clusters in the wireless backhaul network. Multiple RBMs can be assigned to a power zone in which case a common transmit power setting is applied when radio communications occur between a hub and those RBMs in the set of radio resources of the power zone. The power must be updated synchronously for all transmitters mapped to power zones that may interfere with each other. Within each power zone in the downlink, dynamic bandwidth sharing can be performed without affecting the packet error rate performance. This concept also trivially applies to the one zone with one RBM scenario.

Figure 2:
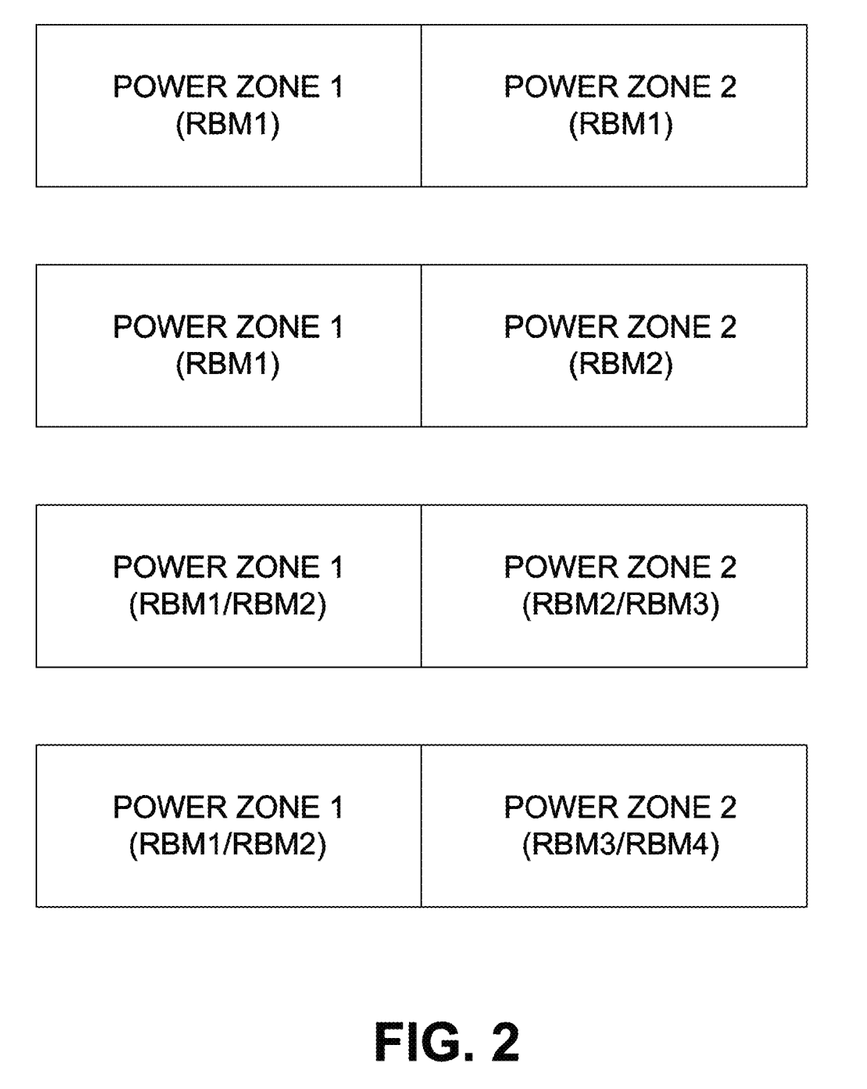
FIG. 2 shows schematically the definition of a plurality of power zones for each hub frame where each cluster comprises a hub serving 1 to 4 RBMs.

An example illustrating schematically the use of two power zones defined in the downlink frame is provided in FIG. 2. Each power zone spans half of the downlink frame duration. In this example, there may be one to four RBMs in a network cluster. FIG. 2 shows four possible mappings of each hub-RBM downlink to the two power zones for one to four RBMs per cluster respectively.

If a power zone is shared by two RBMs, the resource boundary inside the power zone is dynamic, based on the traffic conditions of the two RBMs sharing the power zone.

For each radio link in the backhaul network, one or more power zones may be defined for each transmit frame for the downlink and/or for each transmit frame for the uplink.

Consider a wireless backhaul network comprising a plurality of hubs and a plurality of Remote Backhaul Modules (RBM), wherein each hub i serves a respective cluster i of a set of RBMs j through hub-RBM wireless links ij, comprising the downlink and uplink.

For each transmit frame, one or more power zones is defined. Each power zone comprising a set of radio resources operating at one transmit power level $P_i$, and such that the same power zone is defined over the same set of radio resources across all other clusters k. The transmit power level $P_i$ is between a minimum power level $P_{min}$ and a maximum power level $P_{max}$. Power zone boundaries are synchronized in time across all clusters of the backhaul network. For each power zone, it is required to determine the transmit power level $P_i$ to be applied simultaneously in all clusters using the same set of radio resources by optimization of a weighted sum utility function across the network.

The optimization goal of ICPM is to maximize the summation of the weighted logarithm of the rate expression plus a non-negative constant value, where the rate is approximated as a function of the long term averaged CINR over one or more sets of radio resources, i.e. the one or more power zones, which are commonly defined across the wireless backhaul network.

Figure 4:
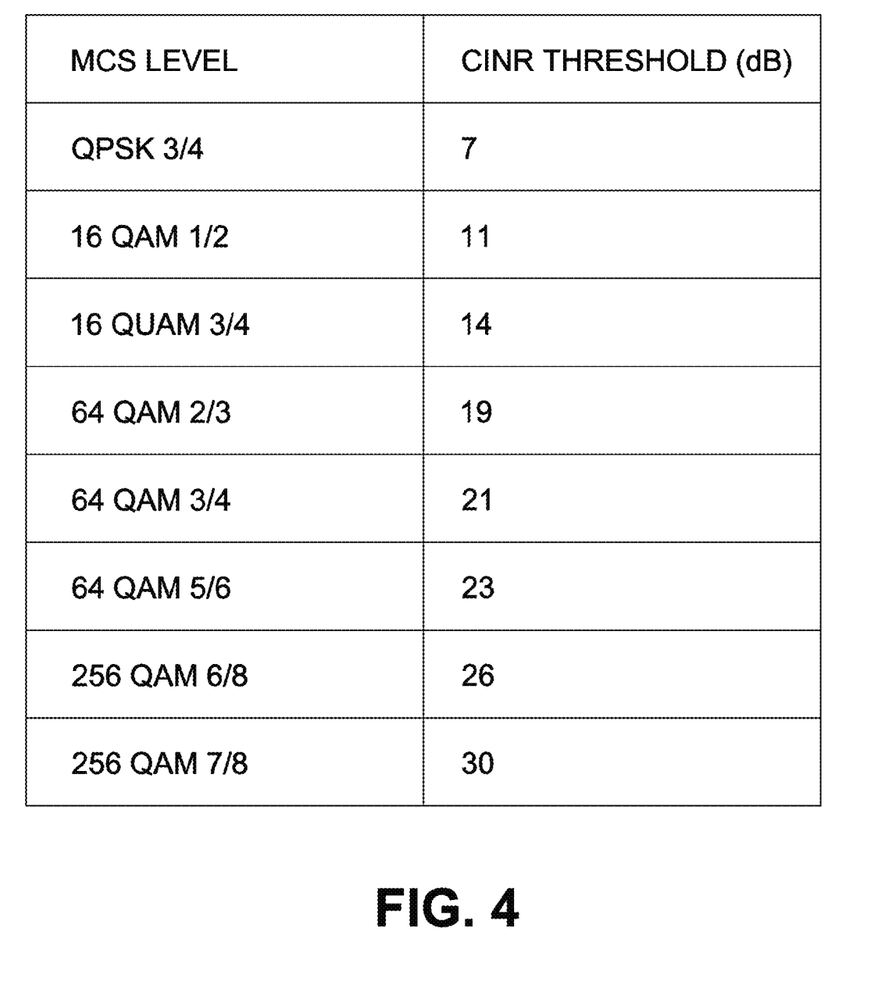
FIG. 4 is a table showing an example of CINR thresholds for different modulation and coding schemes (MCS)

The rate expression has the following form:

$$R = a\log_2\left(1 + \frac{CINR\_PHY}{\Gamma}\right) \quad (Eq\ 1)$$

where CINR_PHY is obtained through measurement of the long term averaged signal power and the long term averaged noise and interference power. The parameters a and $\Gamma$ are determined through a curve fitting procedure. As an example of curve fitting using Eq 1, consider the table of modulation and coding scheme (MCS) definitions and their applied CINR ranges as shown in FIG. 4.

Figure 5:
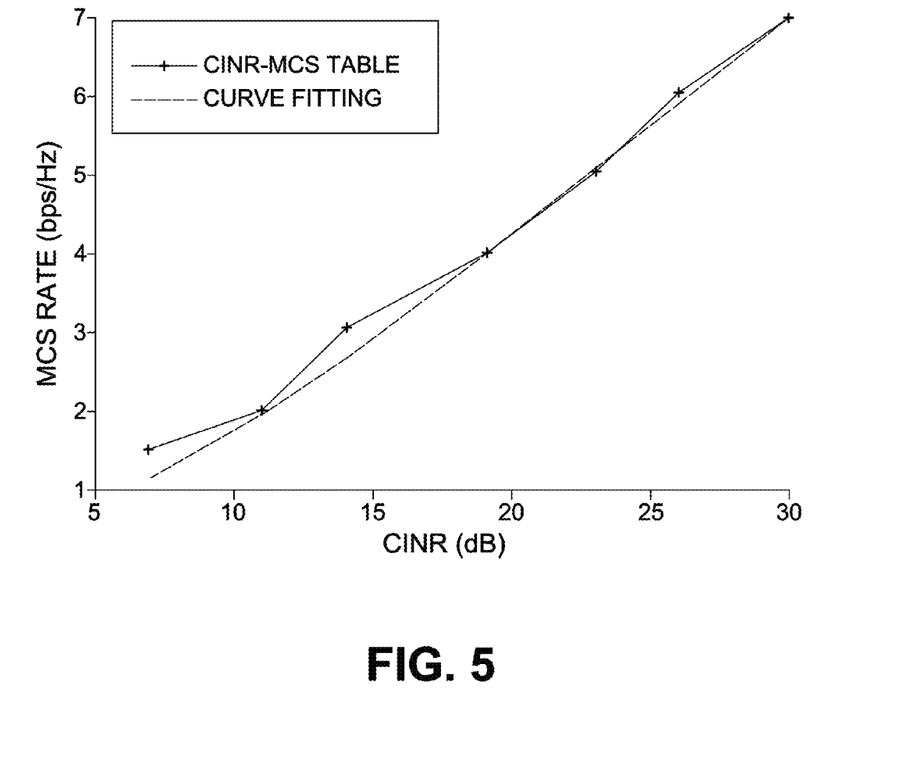
FIG. 5 is graph showing curve fitting of the rate function for different modulation and coding schemes (MCS) in a system for implementing a method of the embodiment.

The curve fitting result is shown in FIG. 5, where a=0.84 and $\Gamma$=5 dB.

We also introduce a non-negative constant c to trade-off the sum rate and fairness performance. The ICPM optimization objective is then formulated as:

$$\max_{P_i} \sum_i \sum_{j \in S_i} w_{ij} \log(\log(1 + CINR_{ij}) + c) \quad (Eq\ 2)$$

$$s.t. \quad CINR_{ij} = \frac{g_{ij}P_i}{\Gamma(\sum_{k \neq i} g_{kj}P_k + \alpha g_{ij}P_i + \sigma_{ij}^2)} \quad (Eq\ 3)$$

$$P_{min} \leq P_i \leq P_{max}$$

and wherein the value of c is selected to provide a required balance between fairness and data throughput.

By selecting c close to zero, the formulation becomes equivalent to a proportional fairness based optimization. When c goes very large, e.g. 1500 or more, this formulation collapses to maximizing a sum rate optimization. Thus a network designer may select an appropriate value of c to tradeoff fairness and data throughput. As an example, the value of c value may be chosen as close to 1 to optimize the trade-off between the sum rate and fairness performance. The value of c may be scanned between 0 and a large number, e.g. 1500 to determine an appropriate value of c to provide a required balance between a fairness index and data throughput.

Figure 3:
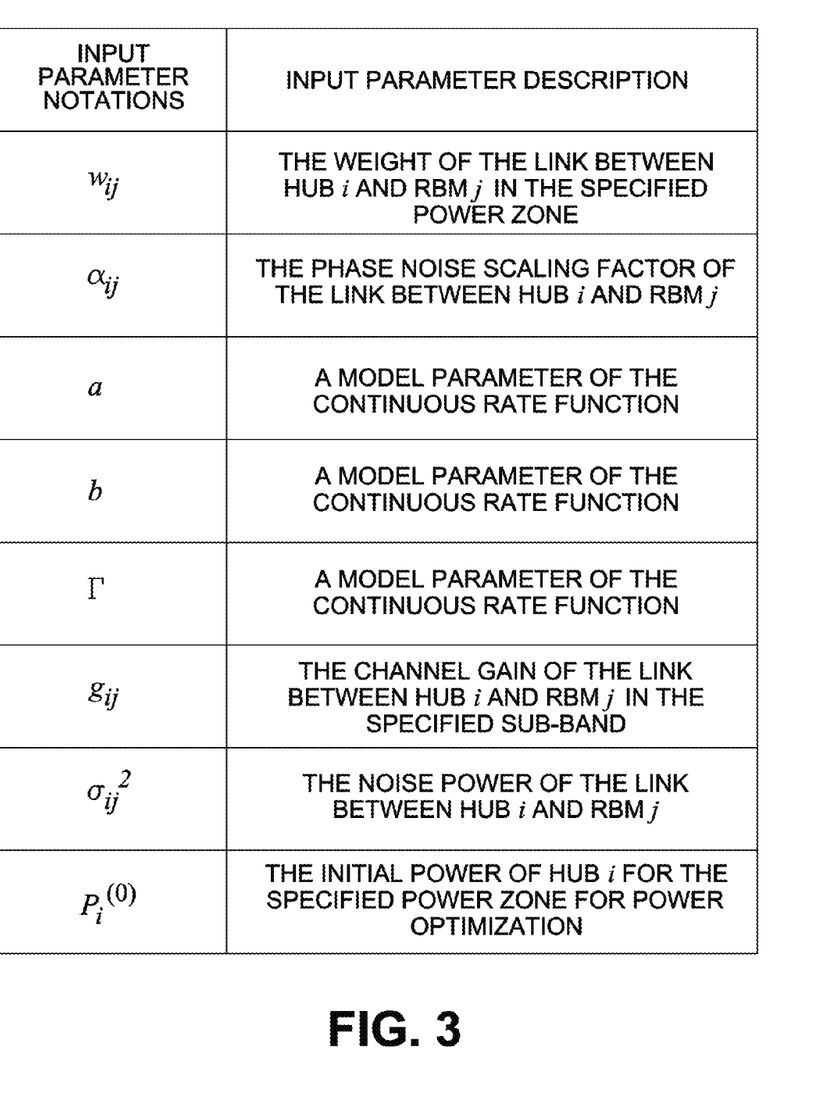
FIG. 3 shows a table of the input parameter for a method for performance management according to an embodiment of the present invention comprising inter-cluster power management (ICPM)

The method of the embodiment is described with reference to the downlink, i.e. between a transmitting Hub and receiving RBM. As an example, input parameters for the method are summarized in FIG. 3, for each Hub i to RBM j downlink. (More generally the method may be applied to uplink channels, i.e. radio links between a transmitting RBM and receiving Hub by suitable modification or transformation of the optimization).

The power constraint for this embodiment is the simplest power constraint, i.e. assuming there is no temporal power constraint. Depending on the hardware capabilities, there may be a temporal power constraint for different power zones in time.

The set $S_i$ is the set of RBMs belonging to the network cluster of Hub i in a particular power zone. The term $\alpha g_{ij}P_i$ is used to model the interference caused by hardware non-ideality, and it is proportional to the transmit power $P_i$.

The weight $w_{ij}$ represents the weight selected for hub i and RBM j. This weight factor can be selected based on the traffic requirement of each link or based on the long term queue statistics if not using elastic traffic. In a preferred embodiment, the weight $w_{ij}$ can be selected based on the sum of the bandwidth allocated per service flow or group of service flows over all service flows supported or allowed in the radio link between a hub and an RBM in a network cluster.

The solution to the optimization uses Newton's method with projection to the constraint space. We introduce a change of variable to speed up the convergence, i.e. set $$v_i = \frac{1}{P_i}.$$

Figure 6:
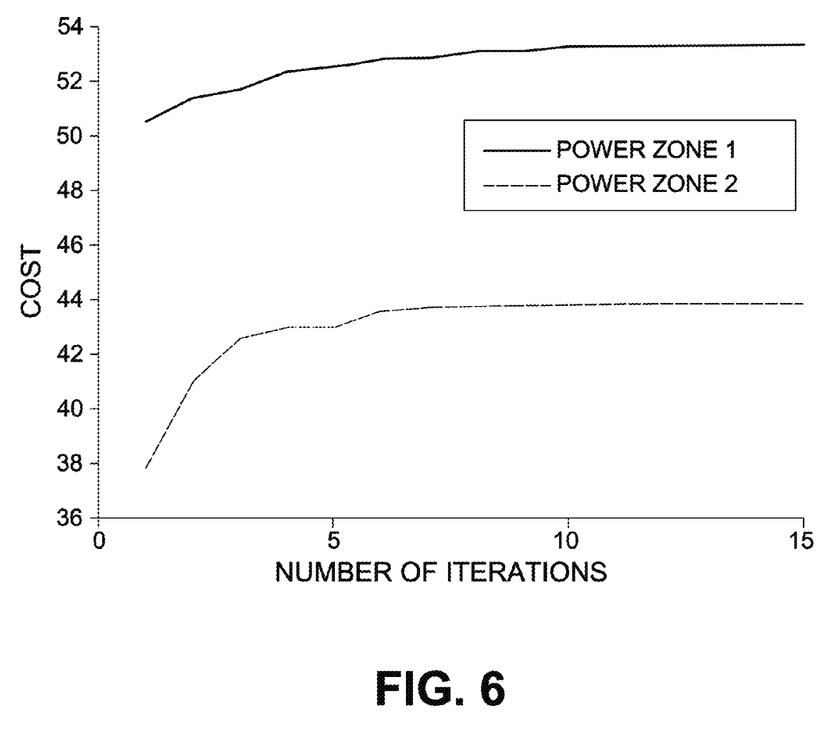
FIG. 6 shows an example of the convergence speed of the method of the embodiment in a wireless backhaul network comprising two power zones per transmit frame.

Numerical study shows the convergence is very fast with this manipulation. An example of the fast rate of convergence with number of iterations through the algorithm for the case of two power zones is given in FIG. 6.

To guarantee the cost increase (i.e., the objective function increase), a back-track line search is used. Also, at each iteration, the cost and search history are stored. Therefore, in certain cases when convergence is not guaranteed (due to the projection method), the search history can be retrieved and the search point corresponding to the highest cost in history can be adopted.

The back track line search implementation is given as follows:

If n<number of iterations & $\Sigma_i|v_i^{(n)}-v_i^{(n-1)}|$>vtol &|cost$^{(n)}$−cost$^{(n-1)}$|>ctol Initialize $\delta_n$=1;
Choose $\delta_n=\delta_n 4$ and $v_i^{(n)}=v_i^{(n-1)}+\delta_n d_i$ until cost$^{(n)} \geq$cost$^{(n-1)}$ and values $v_i^{(n)}$ are in the constraint set, where vtol and ctol are the tolerance values for the variable $v_i$ and the cost respectively. They are both set to a suitably small value, such as, $10^{-6}$, that is sufficient to determine proper convergence to an optimal point with the smallest number of iterations through the algorithm.

The method provides a reasonable approximation of the log of long-term average rates, based on the long-term average CINR. This method is viable in wireless backhaul networks, and the approximation enables the design of low-complexity methods that offer a good performance improvement as compared to conventional systems, and which are amenable to practical implementation.

Computer simulation results were obtained for a sample wireless backhaul network similar to that illustrated in FIG. 1A, comprising 21 hubs and 84 RBMS. Three hubs are co-located at one hub site and there are 7 hub sites. The hubs use sector antennas and the RBMs use narrow beamwidth antennas. For the simulation, the channel model was a SUI-3 path loss and shadowing model which assumed near line of sight deployment, where antenna gains are determined only by geographic locations of the hubs and RBMs. The hub-to-hub distance was set at 800 meters, with a downtilt angle of any hub antenna of 10 degrees. The number of power zones was first set to four.

Figure 7:
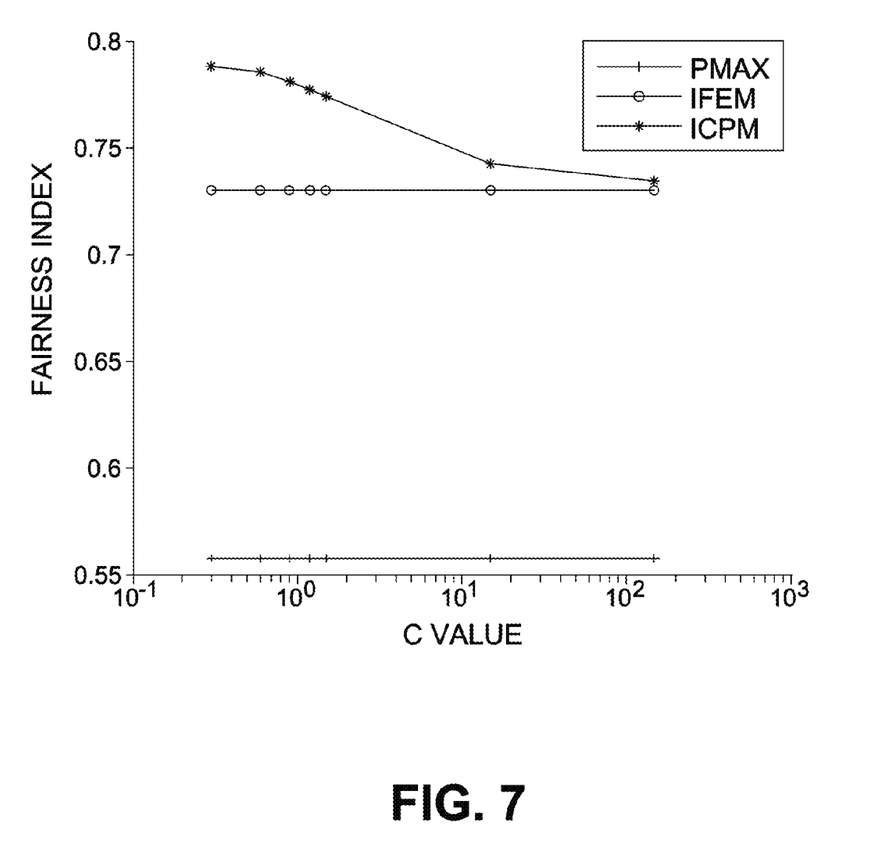
FIG. 7 shows simulation results for a fairness index for c values from 0 to 1500.
Figure 8:
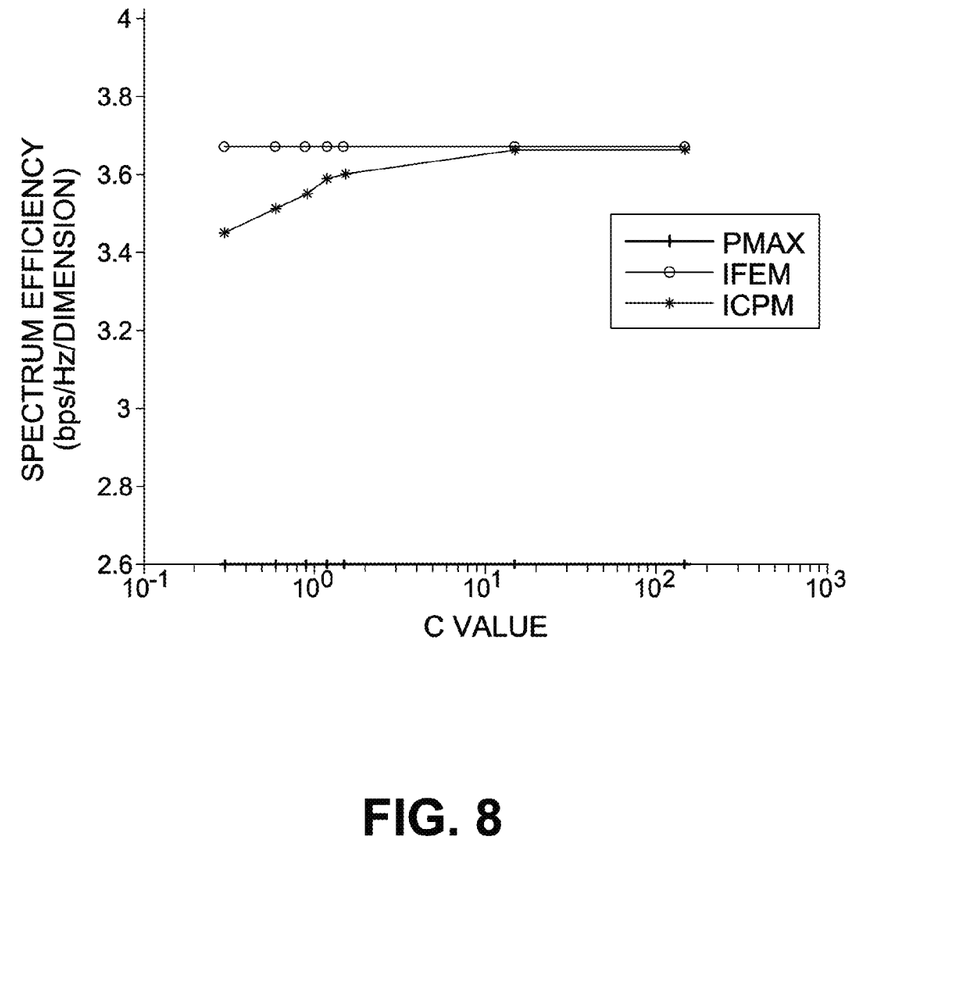
FIG. 8 shows simulation results for the sum throughput for c values from 0 to 1500.

FIGS. 7 and 8 illustrate respectively the Jain's fairness index and the sum throughput as the value of c was varied from 0 to 1500. For comparison, these plots also show simulation values using maximum power (pmax) and using an iterative function evaluation method (IFEM) as described in the above referenced co-pending U.S. patent application Ser. No. 13/463,478.

The simulation results demonstrate that, by an appropriate choice of the constant c, a centralized power optimization method according to an embodiment of the present invention can achieve a balance between data throughput and fairness index.

The non-negative constant c is introduced to provide an appropriate trade-off or balance between proportional fairness and data throughput, and a method is disclosed for obtaining an appropriate value of c.

As an example, when the value of c approaches zero, the method is effectively equivalent to optimizing proportional fairness. Setting the value of c to a large number, or infinity, maximizes a sum rate. By choosing an appropriate value of c between 0 and a large number provides a chosen between proportional fairness and data throughput. Thus, in a method of a preferred embodiment, the value of c is scanned between zero and a large number, such as 1500, to find a value of c that provides an appropriate balance between proportional fairness and data throughput. Alternatively c may be set to a particular value, such as 1, to provide a required balance between proportional fairness and data throughput.

For this method, the long term channel gains may be measured channel gains, obtained for example as described in co-pending U.S. patent application Ser. No. 13/230,368 entitled "System and Method for Co-Channel Interference Measurement and Managed Adaptive Resource Allocation."

When the ICPM technique is applied for orthogonal frequency division multiple access (OFDMA) networks, the concept of ICPM can be applied to each sub-band, which is a subset of the OFDMA subcarriers, or the entire bandwidth depending on the use cases. The long term average CINR can be obtained by computing the average signal power and the average noise and interference power on each sub-band or the entire bandwidth. In one embodiment, the method is based on an interference term that is proportional to the signal power in CINR, which represents the interference caused by frequency offset, phase noise and other RF non-idealities.

As mentioned above, optionally, the maximization step further comprises a summation over all power-zones, with a constraint to the maximum power-zone difference across power zones (i.e. a temporal constraint). In such a situation, the method comprises solving first the unconstrained problem, then accounting for the maximum power-zone difference constraint through as follows. First, check if the difference between the maximum power of the zones of hub i and the minimum power of the zones of hub i exceeds some nominal value alpha. If it is the case, increase the minimum power-zone value so that the required difference is well satisfied. Then repeat this to make sure all power-zones are within this difference. This is done subsequently for all hubs to make sure the condition is well satisfied.

Methods according to embodiments are described above with reference to the downlink, i.e. radio links ij wherein the transmitting node is a Hub and the receiving node is an RBM. It will be apparent that the method may be applied to the uplink by appropriate modification or transformation of the optimization expression, e.g. such that for each link ij between a transmitting RBM j and a receiving hub i, $g_{ij}$ is the long term average channel gain measured for that radio link.

Embodiments are described above for implementation in a wireless backhaul network where each node of the network is fixed (stationary). Nodes comprise a plurality of hubs and RBM, arranged as a clusters in which each hub serves one or more of RBMs, through wireless links (Hub-RBM radio links). The approximations and constraints of the optimization technique are applicable, for example, when small scale fading variation of the channel is not too severe. This condition applies, for example, to wireless backhaul networks since, each node, i.e. hubs and remote backhaul modules (RBMs), are fixed in location and the hubs are mounted at heights well above ground.

More generally, the method of the embodiments may be applicable to a fixed wireless access network, for example, a wireless network comprising a plurality of fixed nodes, which comprise a plurality of Access Nodes and Remote Terminals, with each Access Node serving a plurality of Remote Terminals.

Systems and methods are disclosed for performance management in wireless backhaul networks through power management, which enables inter-cluster power management. The method is based on maximizing a novel sum utility function across all clusters of the wireless backhaul network using the same radio resources. This function can achieve sum rate and fairness trade-off when the constant value c is properly chosen.

Methods according to the embodiments described above are low in complexity, fast in convergence, and offer a good performance improvement as compared to conventional methods. These methods are particularly applicable for wireless backhaul networks for high capacity data networks. In particular, these methods provide practical optimization design tools for wireless backhaul products in MicroCell and PicoCell networks. Accordingly, also provided are systems and software for implementation of these methods.

All publications, patents and patent applications cited in this specification are herein incorporated by reference as if each individual publication, patent or patent application were specifically and individually indicated to be incorporated by reference. The citation of any publication is for its disclosure prior to the filing date and should not be construed as an admission that the present invention is not entitled to antedate such publication by virtue of prior invention.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A method for performance management through power control in a wireless backhaul network comprising a plurality of fixed nodes, each node comprising a transmitter, receiver and directional antenna, said nodes being arranged as plurality of hubs and a plurality of Remote Backhaul Modules (RBM), wherein each hub i serves a respective cluster i of a set of RBMs j through hub-RBM wireless radio links ij, comprising both downlink and uplink channels, the method comprising:

for each transmit frame, defining one or more power zones, each power zone comprising a set of radio resources operating at one transmit power level $P_i$ for cluster i, and such that the same power zone is defined over the same set of radio resources across all other clusters k, wherein the transmit power level $P_i$ is between a minimum power level $P_{min}$ and a maximum power level $P_{max}$, and power zone boundaries are synchronized in time across all clusters of the backhaul network;

for each radio link ij, obtaining channel data comprising a channel gain $g_{ij}$;

for each power zone, determining the transmit power level $P_i$ to be applied simultaneously in all clusters using the same set of radio resources, by steps comprising optimization of a weighted sum utility function across the network using a rate expression based on a carrier to interference and noise ratio (CINR) function, wherein the weighted sum utility function across the network comprises a summation of the weighted logarithm of the rate expression plus a non-negative constant value c, and wherein, based on a Newton's method approach, the optimization is defined by:

$$\max_{P_i} \sum_i \sum_{j \in S_i} w_{ij} \log(\log(1 + CINR_{ij}) + c)$$

$$\text{s.t. } CINR_{ij} = \frac{g_{ij} P_i}{\Gamma(\sum_{k \neq i} g_{kj} P_k + \alpha g_{ij} P_i + \sigma_{ij}^2)}$$

$$P_{min} \leq P_i \leq P_{max}$$

where:
$S_i$ is the set of RBMs belonging to the network cluster of Hub i in a particular power zone; $w_{ij}$ represents the weight selected for hub i and RBM j; and $g_{ij}$ is the channel gain for radio link ij;

selecting the value of c to provide a chosen balance of proportional fairness and data throughput, and applying the respective transmit power level $P_i$ simultaneously to each power zone of transmit frames transmitted by hubs and RBMs in all clusters using the same set of radio resources.

2. The method of claim 1 wherein c is set to a default value of one, or, wherein the value of c is swept from 0 to a very large number to find an optimized tradeoff between the weighted sum rate and a fairness index.

3. The method of claim 1 wherein in each cluster, if a power zone is shared by two or more RBMs, a resource boundary within the power zone is assigned dynamically based on traffic conditions of the RBMs.

4. The method of claim 1, wherein $g_{ij}$ is the long-term average channel gain measured between the $j^{th}$ RBM and the hub in cluster i.

5. The method of claim 1, wherein, when applied to the downlink, $g_{kj}$ is the long-term average channel gain measured between the $j^{th}$ RBM in cluster i and a potentially interfering hub in cluster k.

6. The method of claim 1, wherein, when applied to the uplink instead of the downlink, the optimization is modified accordingly and such that for each link ij between a transmitting RBM j and a receiving hub i, $g^{ij}$ is the long term average channel gain measured for that radio link.

7. The method of claim 1 comprising updating the weights $w_{ij}$ and the power levels $P_i$ with changes in channel measurements and data traffic load, so as to dynamically adapt to the interference environment.

8. The method of claim 1, wherein the power level $P_i$ of each hub is found by changing variable $$v_i = \frac{1}{P_i},$$

determining $v_i$, and then updating $v_i$, and wherein the value of $v_i$ is found iteratively using the step size $d_i$ that can be found as $$d_i = \frac{grad_i}{scale_i},$$

wherein $$grad_i = -\sum_{j \in S_i} \frac{w_{ij}}{\log(1 + CINR_{ij}) + c} \frac{CINR_{ij}}{1 + CINR_{ij}} \frac{1 - \Gamma \alpha CINR_{ij}}{v_i} +$$

$$\sum_{k \neq i} \sum_{l \in S_k} \frac{w_{kl}}{\log(1 + CINR_{kl}) + c} \frac{CINR_{kl}^2}{1 + CINR_{kl}}$$

$$\frac{\Gamma_{gil} v_k}{g_{kl} v_i^2}.$$

and wherein $$scale_i = \sum_{j \in S_i} \frac{w_{ij}}{\log(1 + CINR_{ij}) + c} \frac{CINR_{ij}}{1 + CINR_{ij}} \frac{(1 - \Gamma \alpha CINR_{ij})^2}{v_i^2} +$$

$$\sum_{j \in S_i} \frac{w_{ij}}{\log(1 + CINR_{ij}) + c} \frac{CINR_{ij}}{(1 + CINR_{ij})^2} \frac{(1 - \Gamma \alpha CINR_{ij})^2}{v_i^2} -$$

$$\sum_{j \in S_i} \frac{w_{ij}}{(\log(1 + CINR_{ij}) + c)^2} \left(\frac{CINR_{ij}}{1 + CINR_{ij}}\right)^2 \frac{(1 - \Gamma \alpha CINR_{ij})^2}{v_i^2}.$$

9. The method of claim 8, wherein successful convergence to an optimal point is aided by a back-track line search of the form:

if n<number of iterations $\&\Sigma_i|v_i^{(n)} - v_i^{(n-1)}|>$vtol& $|\text{cost}^{(n)} - \text{cost}^{(n-1)}|>$ctol initialize $\delta_n = 1$;

choose $\delta_n = \delta_n/4$ and $v_i^{(n)} = v_i^{(n-1)} + \delta_n d_i$ until $\text{cost}^{(n)} \geq \text{cost}^{(n-1)}$ and values $v_i^{(n)}$ are in the constraint set.

10. The method of claim 9, wherein tolerance values, vtol and ctol, are set to terminate the iterative process.

11. The method of claim 8, wherein a search history is maintained and if processing is terminated without successful convergence to an optimal point, the highest point in the history is applied as the outcome of the optimization process.

12. The method of claim 1, further comprising a summation over all power-zones using a maximum power-zone difference constraint across power zones, by steps comprising:

checking if the difference between the maximum power of the zones of each hub i and the minimum power of the zones of that hub i exceeds some nominal value alpha, and then by increasing the minimum power-zone value so that the required difference is well satisfied, and repeating this process until all power-zones are within this difference for all hubs across the whole network.

13. A network server in a wireless backhaul network comprising a plurality of fixed nodes, each node comprising a transmitter, a receiver and a directional antenna, said nodes being arranged as plurality of hubs and a plurality of Remote Backhaul Modules (RBM), wherein each hub i serves a respective cluster i of a set of RBMs j through hub-RBM wireless radio links ij, comprising both downlink and uplink channels, the network server comprising
- a processor,
- data storage for storing channel data comprising a measured channel gain $g_{ij}$ for each of the plurality of radio links ij, and
- a non-transitory computer readable medium storing instructions for execution by the processor for implementing the methods steps of claim 1.

14. A non-transitory computer readable storage medium storing instructions for execution in a processor of a network server of a wireless backhaul network, for performing the method steps of claim 1.

15. A system comprising a wireless backhaul network comprising a plurality of fixed nodes, each node comprising a transmitter, a receiver and a directional antenna, said nodes being arranged as plurality of hubs and a plurality of Remote Backhaul Modules (RBM), wherein each hub i serves a respective cluster i of a set of RBMs j through hub-RBM wireless radio links ij, comprising both downlink and uplink channels, at least one node further comprising,
- a processor,
- data storage for storing channel data comprising a measured channel gain $g_{ij}$ for each of the plurality of radio links ij, and
- a non-transitory computer readable medium storing instructions for execution by the processor for implementing the method steps of claim 1.

* * * * *